United States Patent Office 3,452,665
Patented July 1, 1969

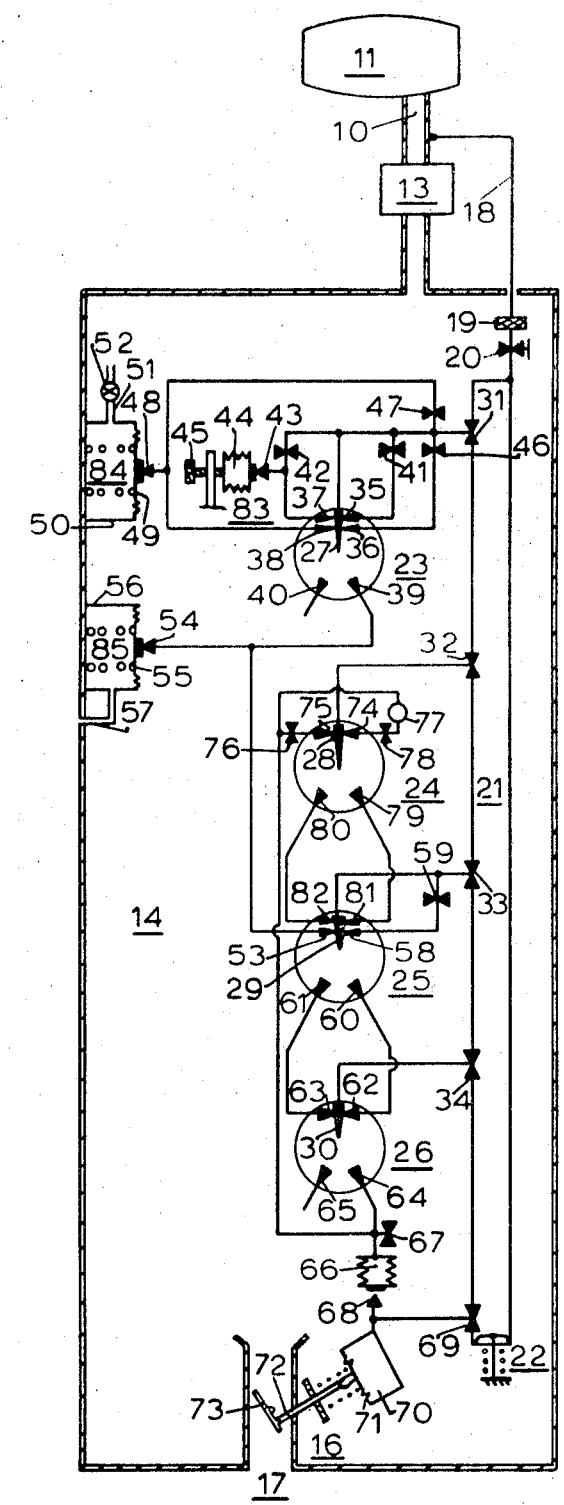

3,452,665
PRESSURE CONTROL SYSTEMS FOR
PRESSURIZED COMPARTMENTS
Owen D. Furlong, East Coker, Somerset, England, assignor to Westland Aircraft Limited, Somerset, England
Filed July 17, 1967, Ser. No. 653,888
Claims priority, application Great Britain, Sept. 21, 1966, 42,232/66
Int. Cl. B64d 13/04; F16d 1/08, 1/14
U.S. Cl. 98—1.5   5 Claims

ABSTRACT OF THE DISCLOSURE

A fluid control system for pressurizing a compartment and employing a fluid amplifying device having at least one stage of amplication wherein fluid from control nozzles controls the direction of flow of fluid from a power nozzle to one or more outlets. A single stage of the fluid amplifying device includes all three of the following: a device for sensing absolute pressure, a device for sensing rate of change of pressure and a device for sensing differential pressure.

---

This invention relates to pressure control systems for pressurized compartments, in particular, but not exclusively, for pressurized compartments in aircraft.

Control systems for pressurized compartments frequently require, besides an absolute control to maintain the compartment at a selected pressure, a rate of change of pressure control, to avoid excessively fast pressure changes which might cause discomfort to passengers, and a differential control which prevents an excessive difference in pressure between the interior of the compartment, and the ambient conditions around the compartment.

Many control systems have been employed to achieve these functions, using transducers and mechanical or electrical systems in combination with pneumatic devices, but mechanical systems are frequently sensitive to attitude or gravitational loading, and electrical components drift or show instability.

An object of the present invention is to provide a pneumatic system with a minimum of moving parts, and to reduce or eliminate the previous problems almost entirely by using a pure fluid system of fluid amplifiers to operate valve means controlling the intake or discharge from a pressurized compartment.

The invention consists in a control system for a pressurized compartment having absolute, rate, and differential pressure signals applied within a single stage, in a fluid amplification device of the type where a fluid power nozzle is directed into one or more outlet channels by interaction with fluid issuing from control nozzles.

In one aspect of the invention, the absolute signal is modified or overridden by the rate signal, as the signal resultant from these signals is modified or overridden by the differential signal.

In another aspect of the invention, the absolute signal and rate signal are applied to divert the power jet of the said single stage, and the differential signal is applied to affect the output of the said single stage.

In yet another aspect of the invention, the rate signal is derived from variations in the fluid flow to a control nozzle in a fluid amplifier device produced by valve means operated by the differential pressure between the pressure within the pressurized compartment and the pressure within an enclosed container having a leakage into the pressurized compartment.

In a further aspect of the invention, a pressure source supplies fluid under pressure to a compartment, and valve means control the inlet or outlet of fluid from the compartment, whereby the pressure within the compartment is maintained at an absolute value above the ambient pressure around the compartment, said valve means being controlled by a pure fluid amplification system, including pure fluid amplifiers of the type wherein a fluid power jet issuing from a power nozzle is directed into one or more outlet channels by interaction with a fluid issuing from control nozzles, at least one of said fluid amplifiers receiving a signal containing components in relation to absolute pressure and rate of change of pressure within the container, and differential pressure between the compartment and ambient around the compartment.

One embodiment of the invention, given by way of example only, will be described in relation to the accompanying drawing, which shows a diagram of a control system for a pressurized aircraft cabin.

In the figure, a pressure source, in this case a duct 10 tapping an aircraft engine 11, supplies air under pressure through a conditioning system 13 to the cabin or campartment 14 of the aircraft. A discharge valve 16 controls the outlet of air from the compartment 14 to ambient 17, around the compartment. The discharge valve 16 is a pneumatically operated valve under the control of a fluid amplifier system shown within the compartment.

A duct 18, branching from the engine tapping duct 10, supplies air under pressure through a filter 19 and a reducing valve 20 to a manifold 21 which provides a fluid power supply for the amplifier system. A relief valve 22 avoids excessive pressure within the manifold 21.

In the amplifier are four fully vented, beam deflection, jet interaction analogue fluid amplifiers 23, 24, 25 and 26, each having a power nozzle 27, 28, 29 and 30, respectively, supplied by ducts tapping the manifold through adjustable restrictors 31, 32, 33 and 34.

In the sensing fluid amplifier 23 are four control nozzles 35, 36, 37 and 38, issuing fluid which interacts with fluid issuing from the power nozzle 27. The resultant effect of the fluid from the control nozzles is to direct the fluid from the power nozzle 27 more strongly into one or other of the outlet channels 39 and 40 of the amplifier, or to be divided between the two outlet channels; any excess air or air passing between the channels is vented to cabin 14.

Two control nozzles 35 and 37, opposed to each other in the amplifier 23, produce an effect related to absolute pressure upon the power jet. These nozzles 35 and 37 are supplied through adjustable restrictors 41 and 42 from ducts branching from the supply duct to the power nozzle 27. The control nozzles 35 and 37 could be supplied through restrictors direct from the manifold 21, but a pressure reduction in two stages through the restrictor 31 followed by 41 and 42, is more suitable for the realtively low control pressures required. Nozzles 35 is supplied through the adjustable restrictor 41, and acts as a bias upon the power jet, whilst nozzle 37, supplied through the resistor 42, includes a branch duct which varies the supply to the control nozzle 37, by bleeding the supply through a pad valve 43 into the cabin in relation to the position of a sealed bellows capsule 44. The capsule is adjusted by a screw 45 to select an absolute pressure, then cabin pressure, acting upon the capsule 44, opens or closes the pad valve 43, according to whether the cabin pressure is above or below the selected pressure. The pressure at the control nozzle 37 is thus varied in relation to the absolute pressure in the cabin 14.

The two other opposed control nozzles 36 and 38 in the sensing amplifier 23 produce an effect related to the rate of change of cabin pressure upon the power jet.

The nozzles 36 and 38 are supplied, similarly to the absolute control nozzles 35 and 37, through adjustable restrictors 46 and 47 from ducts branching from the supply duct to the power nozzle 27. Similarly, one nozzle 36 is supplied directly through the restrictor 46 to act as a bias, whilst the supply to the opposed control nozzle 38, through the restrictor 47, is varied by a pad valve 48, which allows air to bleed from a branch in the duct. The pad valve 48 is positioned upon a spring-loaded diaphragm 49, which forms one wall of a sealed container 50. The container 50 is allowed to leak into the cabin 14 through a duct 51, the rate of leakage being adjustable by means of a valve 52, which acts as a rate control. During changes in cabin pressure, the position of the pad valve 48 alters in relation to the differential pressure between the cabin 14 and the interior of the container 50, until the leakage through the valve 52 balances the pressure inside and outside the container. Thus the position of the pad valve 49, and the pressure at control nozzle 38, varies during pressure changes within the cabin, and produces an effect on the power jet from nozzle 27, in relation to rate of change of cabin pressure.

The effect of the rate control nozzles 36 and 38 is dominant to the effect of the absolute control nozzles 35 and 37, and overrides their effect finally upon the discharge valve 16. This result is achieved both by adjustment of the restrictors to produce greater authority at the rate control nozzles, and by positioning the rate control nozzles 36 and 38 to react upon the power jet from nozzle 27 downstream of the absolute control nozzles 35 and 37.

The resultant effect of the absolute and rate control nozzles 37 and 38, respectively, and their associated bias nozzles 35 and 36, is to direct the power stream from nozzle 27 more or less strongly into one or other of the output channels 39 and 40. Nozzle 40 is vented to cabin, but nozzle 39 supplies a control nozzle 53 in control amplifier 25. The duct carrying the signal from outlet channel 39 to control nozzle 53 branches to a pad valve 54, which is closed at low differential pressures, but, if the differential exceeds a maximum value, selected by the values of the components involved, the valve 54 opens and allows air to bleed from the line supplying the control nozzle 53.

The pad valve 54 is operated by movements of a spring-loaded diaphragm 55, upon which it is positioned. The diaphragm 55 encloses one wall of a container 56, which is connected by a static duct 57 to the ambient air 17 around the compartment 14, in order to maintain the interior of the container 56 at ambient pressure. Thus, if cabin pressure exceeds the pressure exerted by the spring-loading and by ambient, the diaphragm 55 is depressed, and the valve 54 opens, allowing the signal from sensing amplifier 23 to bleed into the cabin 14. The differential control, accordingly, dominates the absolute and rate signals, and overrides their effect upon the discharge valve 16.

Control nozzle 53 applies all three signals, absolute, rate, and differential, developed within a single stage of the system, that is, in the input and output of the sensing amplifier 23, to deflect the power jet from nozzle 29 in control amplifier 25. Control nozzle 53 is opposed by a bias from control nozzle 58, which is applied through an adjustable restrictor 59 from a duct branching from the supply to the power nozzle 29.

Outlet channels 60 and 61 conduct the output from control amplifier 25 to control nozzles 62 and 63 of the subsequent power amplifier 26, which acts in cascade, and the control nozzles direct the power jet from nozzle 30 more or less strongly into one or other of the amplifier outlet channels 64 and 65. Outlet channel 65 is vented to cabin 14, but outlet channel 64 has three branches; the first feeds a bellows capsule 66, the second vents a part of the output from channel 64 through a restrictor 67, in order to avoid operating the outlet into an enclosed end, and a third branch returns a part of the amplifier output to a lead lag circuit feeding the stabilizing amplifier 24, to provide a stability control for the system.

The capsule 66 expands with an increase in pressure to close a pad valve 68 and reduce the bleed from a duct conveying air through a restrictor 69, from the manifold 21, to a diaphragm chamber 70. In the diaphragm chamber an increase in pressure depresses a diaphragm 71 against a spring-loading, and actuates a linkage 72 to open a butterfly valve 73 in the discharge valve 16.

The feedback, returning part of the signal from outlet 64 in power amplifier 26, branches to feed opposed control nozzles 74 and 75, in stabilizing amplifier 24. One nozzle 75 is fed through a restrictor 76, and the other nozzle 74 is fed through a capacitor 77, comprising a small container jointed into the nozzle supply duct, and restrictor 78. Signals or pressure changes are transmitted relatively rapidly to control nozzle 65, but are delayed by the capacity 77. In the case of a rising pressure, the pressure at nozzle 75 exceeds the pressure at nozzle 74, and diverts the power jet more strongly into an outlet channel 79. In the opposite case, during a pressure reduction, the capacitor maintains the pressure at nozzle 74 to exceeds the reducing pressure in nozzle 75, and the power jet is diverted more strongly into outlet channel 80. In the event of a steady output from power amplifier 26, the output from the two control nozzles 74 and 75 balances, and the output from channels 79 and 80 is balanced. The output from the stabilizing amplifier 24 is applied to a pair of opposed nozzles 81 and 82 in control amplifier 25, and produces a damping effect to reduce the effects of phase differences between the discharge valve 16 and the sensors or transducers, which include containers and capsules 44, 50 and 56, and pad valves 43, 48 and 54.

In operation, at a pressure within the compartment or cabin 14 lower than that required by the setting of adjustment screw 45 on the absolute capsule 44, the capsule 44 expands and tends to close pad valve 43, which increases the pressure at control jet 37 in the sensing amplifier 23, relative to the pressure of the bias control jet 35, and diverts the power stream more strongly towards outlet 39.

The increase in pressure in outlet channels 39 is transmitted to control jet 53 in control amplifier 25, provided that the differential pressure is not excessive and pad valve 54 on the differential sensor 56 is not open. The pressure at control nozzle 53 increases relative to that at the bias control nozzle 58, and more of the power jet is diverted to flow into outlet channel 60 relative to the flow into outlet channel 61. The relative pressure at control nozzle 62 increases with respect to that at control nozzle 63 in power amplifier 26, and the power jet is diverted more strongly to vent through outlet channel 65. The pressure in outlet channel 64 and in capsule 66 reduces and pad valve 68 opens more widely, allowing air to escape from the supply to the diaphragm chamber 70. The pressure in the diaphragm chamber 70 reduces, and the spring-loading depresses the diaphragm 71, causing the linkage 72 to tend to close the valve 73; thus air is prevented from discharging from the cabin 14, and the cabin pressure increases to that selected by adjustment of the screw 45.

If the pressure is increasing rapidly, the pressure outside rate container 50 will become greater than that inside, as air cannot leak into the container through the valve 52 as rapidly as the build up of pressure in the cabin 14. Accordingly, valve 48 opens and reduces the pressure in the duct to control nozzle 38; thus the pressure will decrease at this nozzle relative to bias nozzle 36, and the power jet, which is tending to be directed towards outlet channel 39 by the absolute demand for greater pressure, will be returned towards outlet channel 40 by the overriding differential between the rate control nozzles 36 and 38.

Thus the signal throughout the system will be modified, the discharge valve 16 will not close to the extent demanded by the absolute control alone, and an excessive rate of pressure increase is avoided.

During a pressure higher than that required by the setting of the absolute control capsule 44 the reverse of the description given above occurs, finally resulting in the discharge valve 16 opening, and discharging air until the pressure in the cabin drops to that required by the absolute control. The positioning, and accordingly the flow through the discharge valve, is modified by the effect of the rate control, by means of container 50 acting on the pad valve 48, to override the absolute demand to open the discharge valve 16 as just described, which would reduce pressure at a rate which might cause damage or discomfort.

In operation of the differential control, if the pressure in the cabin 14 exceeds ambient pressure to an excessive extent, as predetermined by the spring-loading of the diaphragm 55 in the differential container 56, pad valve 54 opens and reduces the pressure at control nozzle 53 in control amplifier 25. The pressure at control nozzle 53 decreases wtih respect to that at bias control nozzle 58, and the power stream from nozzle 29 tends to be directed more strongly towards outlet channel 61. The pressure at control nozzle 63 increases with respect to that in control nozzle 62, in the power amplifier 26, and the power jet from nozzle 30 is directed more strongly into outlet channel 64. The pressure increase in channel 64 causes the capsule 66 to expand and close pad valve 68. The pressure in chamber 70 increases and the diaphragm 71 and linkage open the butterfly valve 7, to reduce the differential pressure.

It will be appreciated by those skilled in the art that numerous variations and modifications can be made without departing from the scope of the invention, for example, the invention can be applied to the control of pressures in submersible equipment or in hyperbaric chambers. The fluid operating the equipment may be gaseous, or liquid, or combinations of gas and liquid. The pressure source to operate the system can be of any form, for example, bottles of compressed air, a compressor, or air from a compressed gas reservoir. The fluid amplifiers can be of many types, such as pressure interaction or boundary layer of the elbow, double leg, modulator induction, turbulence, focussed jet or vortex type. The system can also include mechanical or electrical devices, if required, although this would introduce some of the problems associated with previous systems.

I claim as my invention:

1. A control system for a pressurized compartment comprising a fluid amplification device having at least one amplification stage, including control nozzles for controlling the direction of flow of fluid from a power nozzle to outlet channels, wherein said device includes within a single stage all three of the following: an absolute means for sensing absolute pressure and developing a signal representative of said absolute pressure, a rate means for sensing the rate of change of pressure and developing a signal representative of said rate of change, and a differential means for sensing the differential pressure between the compartment and ambient.

2. A control system as claimed in claim 1 wherein the signal developed by said absolute means is modified or overridden by the signal developed by said rate means, and the resultant signal is modified or overridden by the signal developed by said differential means.

3. A control system as claimed in claim 1 wherein the signal developed by said absolute means and the signal developed by the rate means are applied to divert the power jet of said single stage and the signal developed by said differential means is applied to affect the output of said single stage.

4. A control system as claimed in claim 1 wherein the signal developed by the rate means is derived from variations in the fluid flow to a control nozzle in a fluid amplifier device, said variations produced by valve means operated by the differential pressure between the pressure within said compartment and the pressure within an enclosed container having a leakage into said compartment.

5. A fluid operated pressurization control system including a means for supplying fluid under pressure to a compartment, valve means controlling the outlet of fluid from said compartment, whereby the pressure within said compartment is maintained at an absolute value above the ambient pressure surrounding the compartment, said valve means being controlled by a pure fluid amplification system, including pure fluid amplifiers of the type wherein a fluid power jet issuing from a power nozzle is directed into one or more outlet channels by interaction with a fluid issuing from control nozzles, at least one of said fluid amplifiers having all three of the following: an absolute means for sensing absolute pressure and developing a signal representative of said absolute pressure, a rate means for sensing the rate of change of pressure and developing a signal representative of said rate of change, and a differential means for sensing the differential pressure between the compartment and ambient.

References Cited
UNITED STATES PATENTS

| | | | |
|---|---|---|---|
| 2,973,702 | 3/1961 | Andresen | 98—1.5 |
| 3,152,534 | 10/1964 | Molloy | 98—1.5 |
| 3,248,053 | 4/1966 | Phillips | 137—81.5 XR |
| 3,324,730 | 6/1967 | Bowles | 137—81.5 XR |
| 3,326,463 | 6/1967 | Reader | 137—81.5 XR |
| 3,364,837 | 1/1968 | Schooling | 98—1.5 |

MEYER PERLIN, *Primary Examiner.*

U.S. Cl. X.R.

137—815